(12) United States Patent
Rai (10) Patent No.: US 8,599,421 B2
(45) Date of Patent: Dec. 3, 2013

(54) METHOD FOR MANAGING ONE OR MORE PRINT PROCESSING QUEUES

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1813 days.

(21) Appl. No.: 11/639,825

(22) Filed: Dec. 15, 2006

(65) Prior Publication Data

US 2008/0144084 A1    Jun. 19, 2008

(51) Int. Cl.
*G06K 15/00*    (2006.01)

(52) U.S. Cl.
USPC ....................................................... 358/1.16

(58) Field of Classification Search
USPC ................................. 358/1.14, 1.16; 718/102
See application file for complete search history.

(56) References Cited

U.S. PATENT DOCUMENTS

| 8,805,502 | | 10/2004 | Rai | |
|---|---|---|---|---|
| 6,993,400 | B2 | 1/2006 | Viassolo | |
| 7,051,328 | B2 | 5/2006 | Rai | |
| 7,079,266 | B1 | 7/2006 | Rai | |
| 2002/0129081 | A1* | 9/2002 | Rai et al. | 709/102 |
| 2005/0015168 | A1* | 1/2005 | Cho | 700/101 |
| 2005/0275875 | A1* | 12/2005 | Jennings, Jr. | 358/1.15 |

* cited by examiner

*Primary Examiner* — Jeremiah Bryar
(74) *Attorney, Agent, or Firm* — Fay Sharpe LLP (57) ABSTRACT

A method of ordering print jobs in a print queue is provided. The method includes storing one set of print jobs in the print queue, and processing the one set of print jobs with a cell (having one or more print processing devices) and a first print job sequencing rule dictating a first print job sequence. Another set of print jobs is stored in the print queue, and processing of the other set of print jobs with both the cell and the first sequencing rule is simulated to obtain a first print job processing indicator. Additionally, processing of the other set of print jobs with both the cell and a second print job sequencing rule, dictating a second print job sequence, is simulated to obtain a second print job processing indicator. The first print job processing indicator is compared with the second print job processing indicator, and, based on the comparison, the other set of print jobs is processed with either the first print job sequencing rule or the second print job sequencing rule.

25 Claims, 8 Drawing Sheets

METHOD FOR MANAGING ONE OR MORE PRINT PROCESSING QUEUES

BACKGROUND AND SUMMARY

The disclosed embodiments relate generally to a method for operating a print processing system and, more specifically, to a method for managing one or more print processing queues by dynamically setting job sequencing rules in accordance with conditions to which the printing system is being subjected.

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total print job volume.

When a new print job arrives, the print job sequentially passes through each department until the print job is completed. The conventional approach can lead to significant time delays, as well as increased work-in-progress and inventory costs.

In accordance with an improved approach, a print shop may be reorganized into autonomous cells as disclosed in U.S. Pat. No. 7,079,266 to Rai et al., the pertinent portions of which are incorporated by reference. For each autonomous cell in a corresponding group, resources (e.g., equipment or stations) are grouped together according to different job classes commonly encountered by a specific print shop.

In the type of print shop contemplated by the '266 patent, print jobs (requiring one or more print processing related operations) are communicated to the print shop for handling by one or more autonomous cells. Prior to communicating the jobs to the one or more cells, a server is used to schedule processing of the jobs (or portions thereof) at the one or more cells. Scheduling systems suitable for use in a given print shop environment are disclosed in U.S. Pat. No. 7,051,328 to Rai et al. and U.S. Pat. No. 7,065,567 to Squires et al.

U.S. Pat. No. 7,051,328 discloses a print workflow including a workflow mapping module that determines a workflow of one of several document processing jobs for processing. A job description module may be used to split at least some of document processing jobs into sub-jobs for processing by the printing devices in the cells. Additionally, a print cell controller, at any one of the cells for receiving at least one sub-job, can be used to further split a sub-job into lots for processing among devices in a given cell. The printing workflow system of the '328 patent permits distribution of document processing jobs throughout a network environment.

The '328 patent further discloses a method of assigning sub-jobs to available cells in a priority workflow system for printing a product-type. The method includes identifying the maximum capacity of the available cells to print the product type. The current capacity of each of the available cells to print product type is also identified. Based on the maximum capacity and current loading of each of the available cells, a current capacity of each of the available cells for printing the product-type is determined. At least one of the available cells is assigned for printing.

U.S. Pat. No. 7,065,567 discloses a system for scheduling a document-processing job in a printing workflow system. The scheduling system includes first and second modules for determining whether the document processing job in a printing workflow system can be processed by one or by a plurality of cells, and determining the time it would take to process the document processing job in the first module. The scheduling system includes a third module for determining timing parameters to accomplish the document-processing job based on the information in the second module. The scheduling system includes a fourth module for applying the timing parameters to one or more cells to process the document processing job by a specified due date. Finally, the scheduling device includes a fifth module for queuing the document processing job in one or more cells based on the information from the fourth module to efficiently process the document processing job by the specified due date.

The pertinent portions of all of the above-mentioned patents are incorporated herein by reference.

U.S. Pat. Nos. 7,051,328 and 7,065,567 appear to contemplate a scheduling approach in which job sequencing rules used by a cell-controller are fixed for a corresponding print shop. These are determined by an assessor who simulates a set of jobs (using a suitable assessment tool) and determines which rule(s) best meets the requirements of the print shop. Examples of known print job sequencing rules include, among others, "Least Slack Time (LST)," "Earliest Due Date (EDD)," "Shortest [Remaining] Processing Time (SPT)," First-In-First-Out (FIFO)," "Last-In-First-Out (LIFO)" or "Maximum Processing Time (MPT)." It has been found that assigning one or more job sequencing rules to a set of queues in a fixed manner can, during given time intervals, lead to degraded shop performance since the effectiveness of at least some rules, based on various factors, can change significantly. For instance, at one utilization level a FIFO rule may result in very acceptable job turnaround for a given cell, while at another utilization level, the job turnaround for the same cell may be wholly unacceptable. Accordingly, it would be desirable to provide a methodology that permits a print shop to dynamically adjust job sequencing rule usage across cells so as to optimize cell processing capability.

In one aspect of the disclosed embodiments there is disclosed a method of ordering print jobs in a print queue. The print queue is operatively associated with a cell having one or more print processing devices for processing print jobs. The method includes: (A) storing a first set of at least two print jobs in the print queue; (B) corresponding a first print job sequencing rule with the print queue, the first print job sequencing rule dictating a first print job sequence in which the first set of at least two print jobs are to be processed; (C) processing the first set of at least two print jobs with the cell in accordance with the first print job sequencing rule; (D) storing a second set of at least two print jobs in the print queue; (E) performing simulations to determine if the second set of at least two print jobs should be processed in accordance with the first print job sequencing rule or a second print job sequencing rule, the second print job sequencing rule dictating a second print job sequence in which the second set of at least print jobs are to be processed, wherein the first print job sequence is different than the second print job sequence; (F) determining, with said simulations of (E), whether the second set of at least two print jobs should be processed in accordance with the first print job sequencing or the second print job sequencing rule; and (G) when it is determined that the second set of at least two print jobs should be processed in accordance with the second print job sequencing rule, changing the correspondence of the print queue from the first print job sequencing rule to the second print job sequencing rule.

In another aspect of the disclosed embodiments there is disclosed a method of ordering print jobs in a print queue. The print queue being is operatively associated with a cell having one or more print processing devices for processing print jobs. The method includes: (A) storing one set of at least two print jobs in the print queue; (B) processing the one set of at least two print jobs with the cell and a first print job sequencing rule, wherein the first print job sequencing rule dictates a first print job sequence in which print jobs stored in the print queue are to be processed; (C) storing another set of at least two print jobs in the print queue; (D) simulating processing of the other set of at least two print jobs in the cell with the first sequencing rule to obtain a first print job processing indicator; (E) simulating processing of the other set of at least two print jobs in the cell with a second print job sequencing rule to obtain a second print job processing indicator, wherein the second print job sequencing rule dictates a second print job sequence in which print jobs stored in the print queue are to be processed, and wherein the first print job sequence is different than the second print job sequence; (F) comparing the first print job processing indicator with the second print job processing indicator; and (G) based on said comparing of (F), processing the other set of at least two print jobs with the cell in accordance with one of the first print job sequencing rule and the second print job sequencing rule.

DESCRIPTION OF DISCLOSED EMBODIMENTS

The disclosed embodiments contemplate the use of a lean production process server (LPPS) for coordinating production of document processing jobs in a document factory (such as a print shop). The server exploits lean production techniques to control document processing jobs. The server can be run on a number of different platforms, including but not limited to, UNIX and Windows ("UNIX" is a registered trademark of the Open Source Group, while "Windows" is a registered trademark of Microsoft Corporation) based-platforms. The server determines workflow priorities and manages workflow accordingly. Those skilled in the art will appreciate that the presently disclosed embodiments may also be practiced with platforms that run other varieties of operating systems. Moreover, the server need not run on a dedicated computer system but rather may run on another variety of electronic devices, such as a printer, copier, etc. Workflow priorities for document processing jobs can be determined by observing the various jobs processing units.

At least one illustrative embodiment disclosed herein presumes that the document factory has been partitioned into autonomous cells. Each cell is a logical grouping of resources (including both equipment and manpower) in the document factory that is sufficient for completing at least one type of document processing job. Thus, a first cell may include a printer and binder whereas a second cell may include a copier and a collator. The LPPS is responsible for distributing document processing jobs among such cells in an efficient manner.

Figure 1:
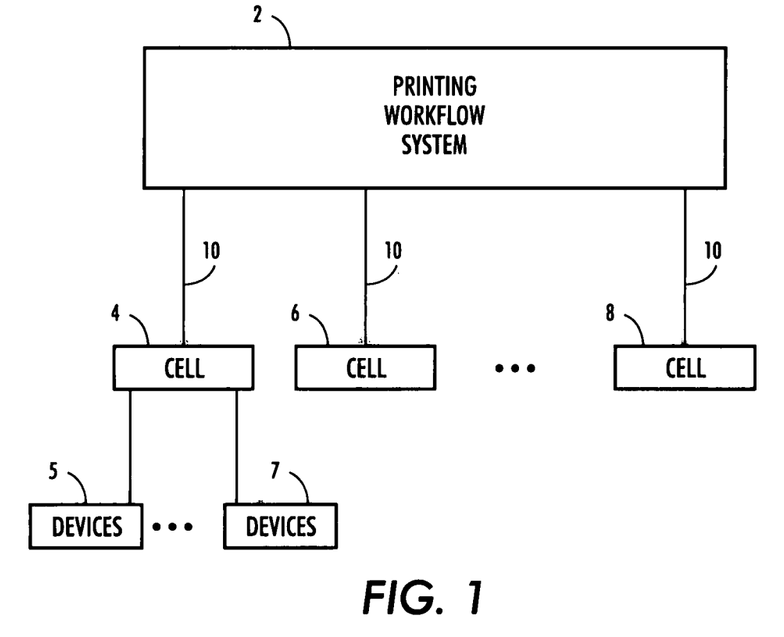
FIG. 1 is a block diagram illustrating a print workflow system in combination with cells and their corresponding devices.

Referring to FIG. 1 a printing workflow system 2 in a print shop (i.e., a document factory) is shown. The printing workflow system 2 controls a multitude of cells 4 through 8. The printing workflow system 2 sends information to and receives information from the cells 4 through 8 via the communication links 10. The cells 4 through 8 are comprised of at least one device 5 for assisting in completing a document processing job of given product-types. For example, printing device 5 could be a 600 dpi monochrome printer, while printing device 7 could be a 1200 dpi color printer.

Figure 2:
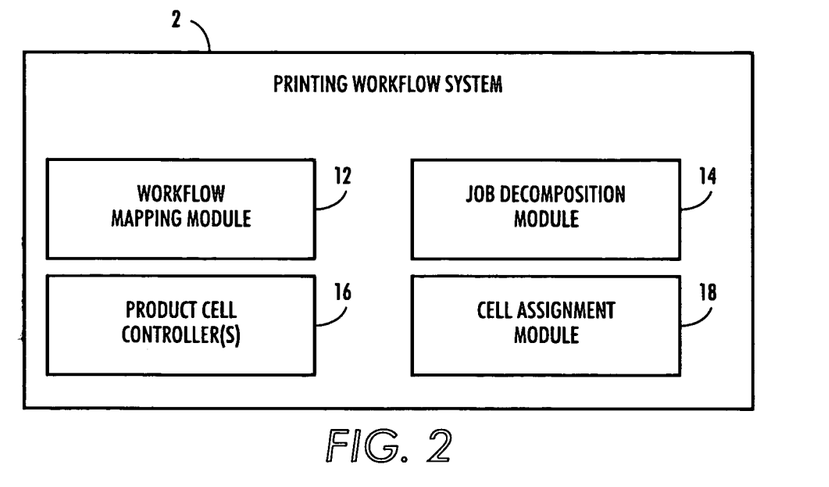
FIG. 2 is a block diagram including software components employed in the print workflow system of FIG. 1.

Referring to FIG. 2, several of the software modules employed in the printing workflow system 2 are shown. The printing workflow system 2 includes a workflow mapping module 12 that determines the workflow for selected document processing jobs. The workflow, among other things, identifies the operational steps needed to complete a document processing job, and the sequence in which these operational steps should be performed. A job decomposition module 14 is included for splitting the document processing jobs into sub-jobs and for sending the sub-jobs to cells for completion. A product cell controller (PCC) 16 may be provided at given cells for receiving at least one sub-job to further split the sub-job to be processed by a device in the cell. Lastly, a cell assignment module 18 is provided for assigning sub-jobs to be processed by a cell.

In general, a print job is received, and a workflow developed for the print job with the workflow mapping module 12. The job decomposition module may split the job into sub-jobs, with the sub-jobs or job then being assigned to cells for completion by the cell assignment module 18. The sub-jobs may be sent to product cell controller 16 of the assigned cells, where each sub-job may be further sub divided.

Figure 3:
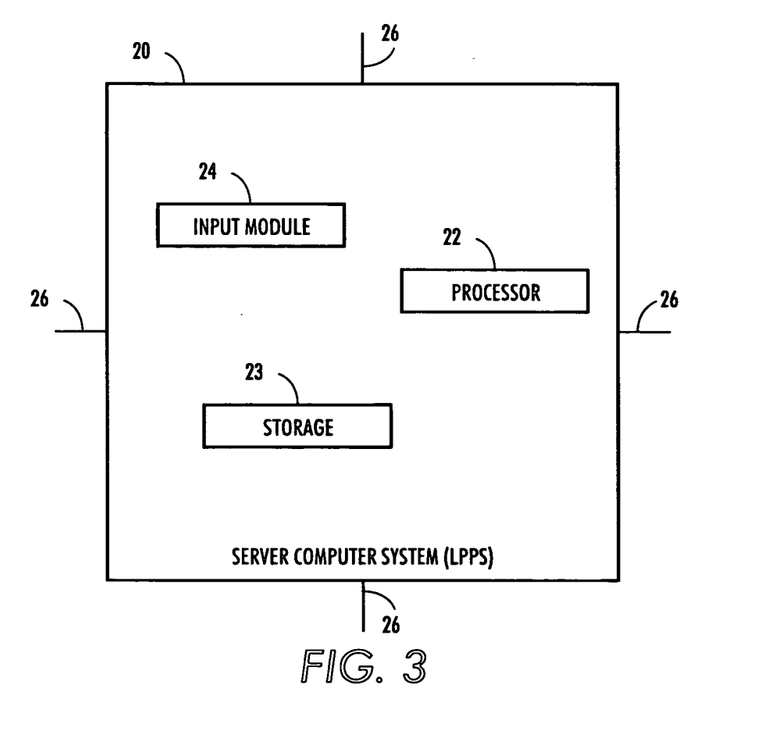
FIG. 3 is a block diagram of a server employing the printing workflow system of FIG. 1.

Referring to FIG. 3, a server computer system 20 (i.e., LPPS) suitable for use in the printing workflow system 2 is shown. The server 20 includes a processor 22, a storage 23, communication links 26, and an input module 24. The input module 24 is used to receive input from various devices via the communications links 26. The input module 24 receives the document processing jobs on behalf of the server 20. The processor 22 executes the programming instructions on the server 20 to manage document processing jobs. The server 20 stores the instructions in the storage 23. For example, modules 12, 14, and 18 and other data may be stored in storage 23. Module 16 may be executed on a separate server that is particular to a cell.

Figure 4:
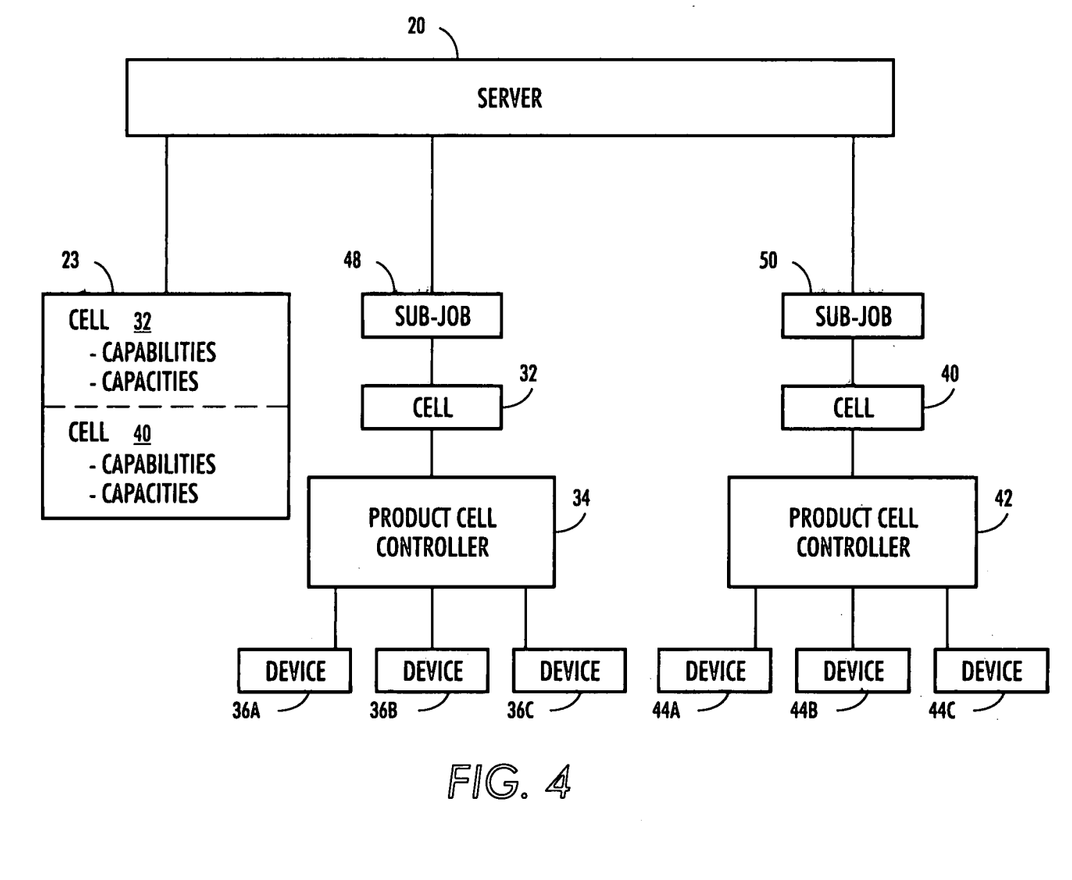
FIG. 4 is a block diagram illustrating how the print workflow system is used to accommodate the splitting of a document processing job into sub-jobs.

Referring to FIG. 4, the printing workflow system 2, interacting with a cell in a network provided in a print server is shown. The product cell controller 16 for the cell receives a sub-job 48 from the server 20 to be further processed by the cell. The server 20 stores, in storage 23, the capacities and capabilities of each cell in the print shop to produce different product-types. For example, cell 32 in the network produces three different types of documents and cell 40 produces two types of documents. (It is quite possible that two different cells can produce similar, or even the same, document types. A document type is uniquely characterized by the sequence of processing steps to completely finish the document). The server 20 stores this information to determine which cell has the capabilities to process a document job. The capacity of each cell is also stored to determine the volume of a particular product-type that a cell can produce.

As stated above, the job decomposition module 14 may split a document processing job into sub-jobs for transmission to various autonomous cells for processing. To the extent a cell in the network is autonomous, it can process a job completely. In the example shown in FIG. 4, a document processing job is split into sub-jobs 48 and 50 that are sent to cells 32 and 40, respectively. The product cell controllers 34 and 42 send the sub-jobs 48 and 50 to device set 36A-36C and device set 44A-44C, respectively, for processing.

Figure 5:
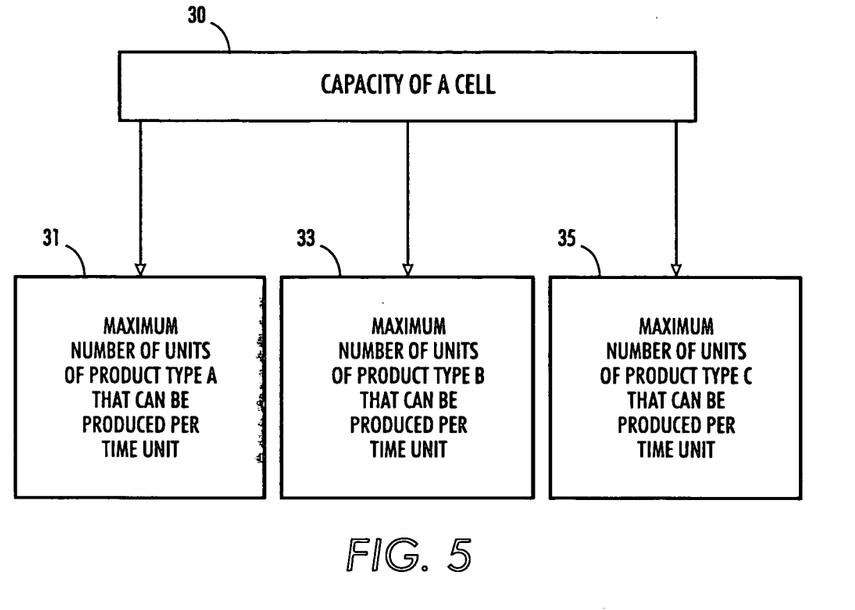
FIG. 5 is a block diagram illustrating a capacity of a cell.

Referring to FIG. 5, an example of how capacity is defined for a cell in an illustrative embodiment is shown. As stated above, the printing workflow system 2 stores the capacity of each cell. "Capacity" is the maximum volume of a particular product type that the cell can produce for a time period. For example, FIG. 5 shows capacities for 31, 33, and 34 three different product types (Product A, Product B, and Product C). The printing workflow system 2 updates the capacities and makes it easier to determine which cells should be assigned a sub-job. Capabilities are used to determine the assignment of a sub-job to a cell.

Figure 6:
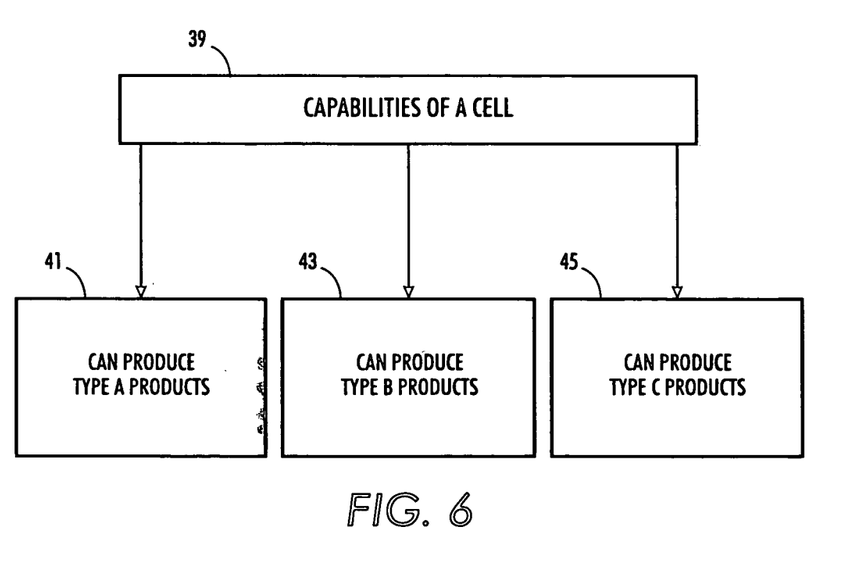
FIG. 6 is a block diagram illustrating some capabilities of a cell.

Referring to FIGS. 2, 4 and 6, an example of the capabilities 39 stored for a cell 32 is shown. Cell 32 is capable of processing various document product-types A, B, C. Hence, capabilities 41, 43, and 45 are stored for cell 32. For example, if a user has a document of product-type D, then cell 32 would not be the choice to accomplish the processing of the document because the cell 32 does not support such a capability. The printing workflow system 2, stores the capabilities for each cell in the print shop. This allows the cell assignment module 18 to examine the capacities and capabilities of the cells to determine which cell to assign a particular sub-job Referring to FIG. 7, a simplified version of a job routing system, for use with the above-described embodiments, is designated with the numeral 50. As contemplated, the router 50, which communicates with a bank of stored jobs 52, may include at least some of the job management capabilities associated with cell assignment module 18 (FIG. 2) and the LPPS 20 (FIG. 3). The router further communicates with a series of print processing related queues 54 (designated as 54-1, 54-2, . . . 54-$n$), which queues, in turn, are respectively operatively associated with cells 4 through 8. In accordance with the disclosed embodiment (and as described in U.S. Pat. No. 7,051,328 (e.g., FIG. 12 and accompanying text)), a job sequencing rule (designated in FIG. 7 as "$SR_i$") is initially assigned to each queue.

As understood by those skilled in the art, a job sequencing rule may be selected from a number of possible approaches, such as "Least Slack Time (LST)," "Earliest Due Date (EDD)," "Shortest [Remaining] Processing Time (SPT)," "First-In-First-Out (FIFO)," "Last-In-First-Out (LIFO)" or "Maximum Processing Time (MPT)." As further understood by those skilled in the art, jobs (or job portions) stored in a given queue are communicated to a corresponding cell in accordance with a pull release strategy. That is, a set of one or more jobs (or job portions) may be "pulled" from a given queue by a corresponding cell to optimize device usage within the cell. This pulling of jobs or job portions is referred to below as "pull release control."

Figure 8:
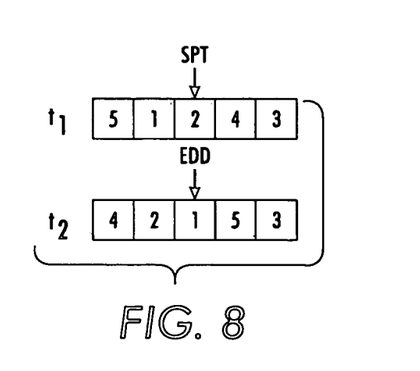
FIG. 8 is a schematic view of one of the job queues of FIG. 7 over two moments in time.

Referring to FIG. 8, a hypothetical situation is provided to demonstrate the effect of job sequencing rules one job release. Pursuant to the hypothetical, five jobs are stored in queue 54-1 at a first time ($t_1$), and then ordered or sequenced in accordance with a first job sequencing rule (such as SPT). The same five jobs may be sequenced in queue 54-1 at a second time ($t_2$), and sequenced in accordance with a second job sequencing rule (such as EDD). As shown by the hypothetical, the order of job release would be different for SPT than it would be for EDD. That is, with SPT, the second job from the left edge of the queue would be released first and, with EDD, the third job from the left is released first. Hence, processing sequence for a given cell may vary as a function of the job sequencing rule assigned to the corresponding queue.

As mentioned in the Background above, while maintaining a static assignment of a job sequencing rule may be suitable under a significant number of circumstances, such assignment does not take into account the possible dynamic nature of a print shop. It has been found that assigning job sequencing rules dynamically can accommodate for a variety of changes in a print shop environment, such as changes in the overall "job profile" of jobs encountered by the print shop, or utilization levels (including device utilization and/or device user utilization) encountered by the cells 4 through 8 (FIG. 1).

Figure 7:
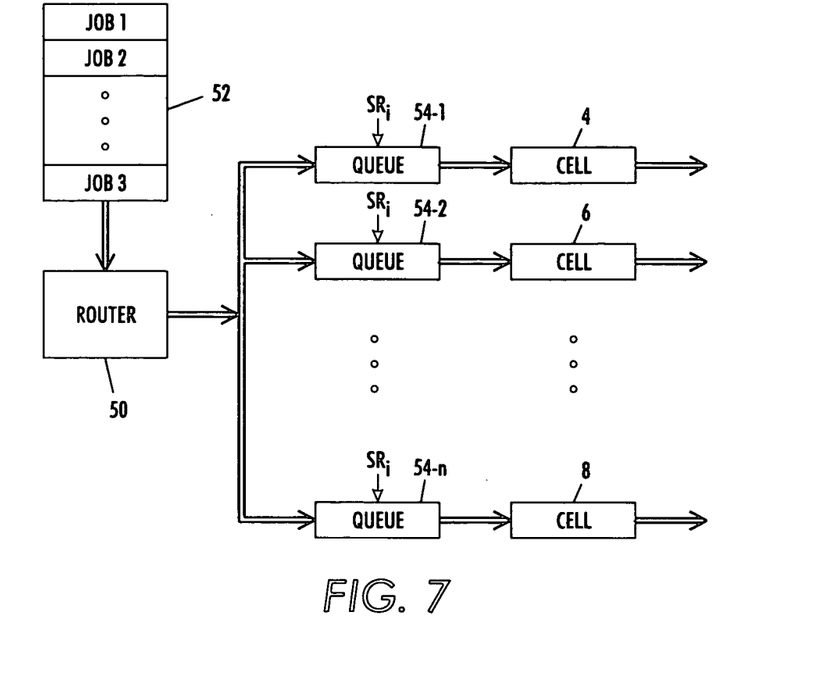
FIG. 7 is a block diagram illustrating an approach for routing jobs to cells by way of a corresponding series of queues.
Figure 9:
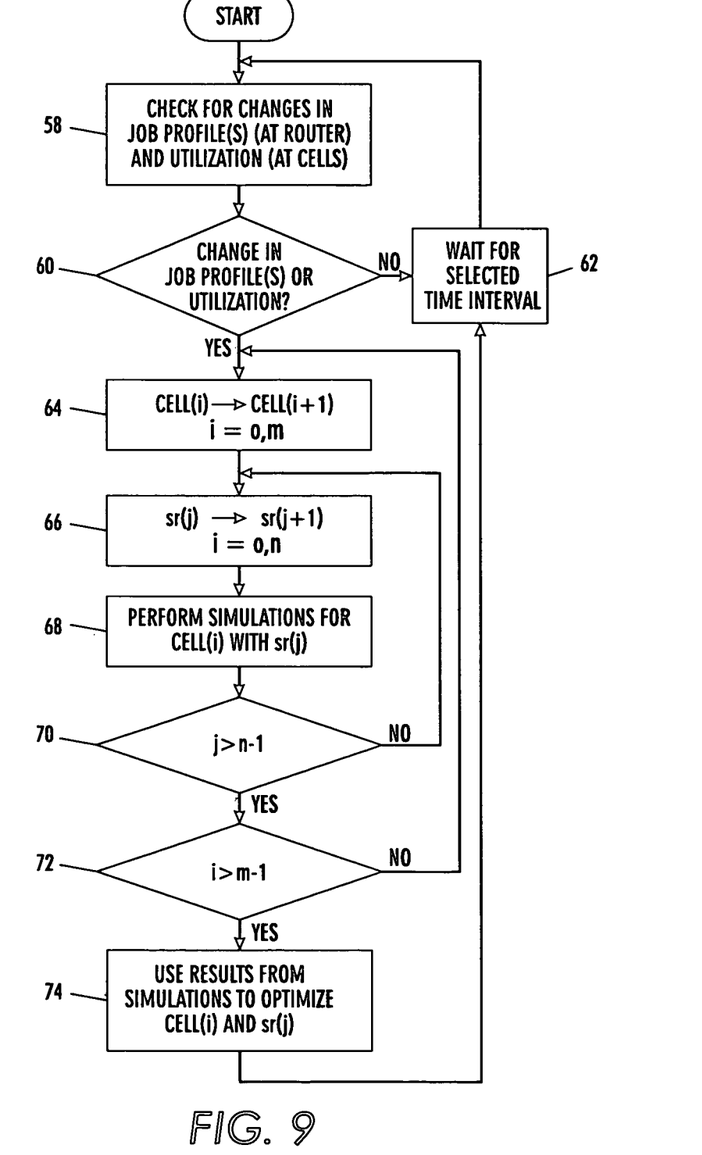
FIG. 9 is a flow diagram illustrating an approach for performing job processing simulations to dynamically assign job sequencing rules across the queues of FIG. 7.

Referring to FIGS. 7 and 9, an approach for dynamically assigning job sequencing rules across queues 54 is described. The following description is focused on dynamically adjusting the job sequencing rules across the queues 54, but in actual practice the process could be performed for as few or as many of the queues 54 as desired. Initially, at 58 a check is performed of the router 50 to determine if there has been a noticeable change in job profile. The term "job profile" refers to the collective properties of the jobs of job bank 52 that might impact the capability of the cells to optimally process the jobs. For instance, a change in average job size or job complexity could result in a change of job profile. Additionally, the check at 58 would examine the utilization encountered at each of the cells 4 through 8. Pursuant to the check at 58, an inquiry is made at 60. If there is no change in job profile or cell utilization, the process proceeds to 62 where it waits for a selected time interval or other event to occur. The wait interval set for 62 might vary in accordance with a variety of factors, such as a perception regarding how often the job profile and/or cell utilization might change over time. Such perceived changes could be ascertained through use of data collected over time at the job bank 52 and/or the cells 4 through 8. It is contemplated that an "other event" could include a variety of structural or functional changes in the print shop. For instance, it might be desirable to employ the process of FIG. 9 shortly after reconfiguring one or more cells of the print shop.

Referring still to FIG. 9, if job profile or utilization deviates by a selected amount, an index i is initialized (at 64) for performing a job processing simulation at the first cell 4 with the jobs currently stored in queue 54-1 ("stored jobs"). At 66, a first job sequencing rule (sr(1)) is selected, and the job processing simulation is performed, at 68, with the stored jobs at cell 4. With query 70, processing of the stored jobs at cell 54-1 can be simulated with a plurality of job sequencing rules. In the exemplary approach of FIG. 9, use of 70 causes processing simulations to be performed for the currently stored job with n rules.

Through use of 72, processing simulations across m cells (with n job sequencing rules for each cell) are performed. As will appear from the simulation example below, the above process permits creation of all of the data necessary to dynamically select optimal job sequencing rules for each one of cells 4 through 8. Once all of the results from the simulations are collected (74), decisions regarding how to optimally map job sequencing rules across the queues 54 can be made.

Print shop simulations demonstrate that at low to mid-utilization levels (typically less than 60%), shop performance is less sensitive to the type of sequencing rule employed. However at higher levels of utilization, sensitivity can increase so that improper selection of sequencing policy can result in poor performance. Furthermore, if performance variability is high, job sequencing rule selection may require short planning horizons. Large print shops with high fluctuations at high utilizations are often found in large enterprise transaction environments.

Figure 10:
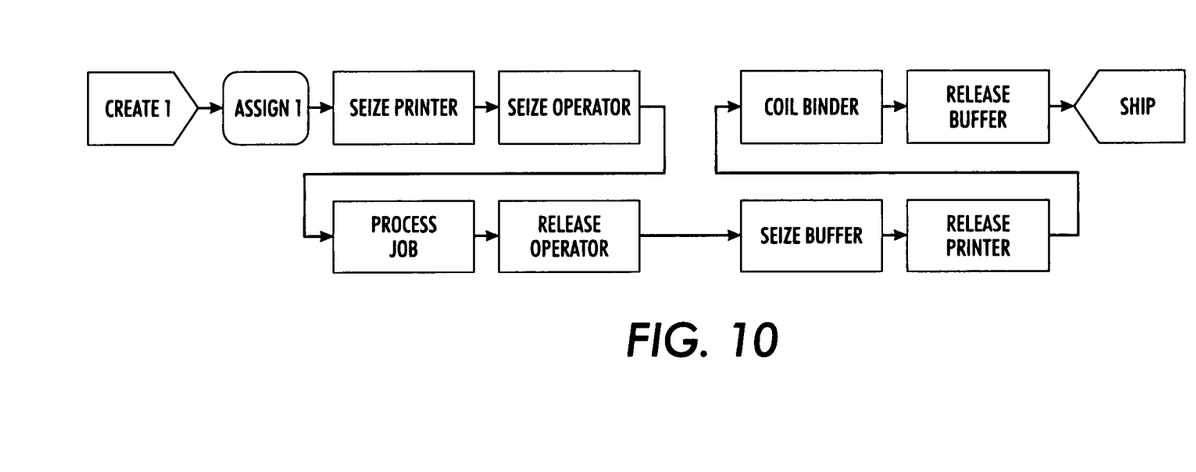
FIG. 10 is a schematic view of a discrete-event simulation model for a production environment in which coil bound books are produced.

Referring to FIG. 10, a workflow model, including a printer and binder, is used to consider a change in utilization for a production environment. In this model, the printer possesses a rated output of 6,000 impressions per hour. It is assumed that, (a) jobs arrive at the printer randomly every 2 hours, (b) the average job size is 10,000 impressions, and (c) the jobs are due 15 hours from the time of arrival. The variation in the job size is modeled by an exponential distribution with a mean of 10,000. The printer is capable of printing at a constant rate of 6.00 impressions per hour. The impact of random failures on the printer was modeled with an exponentially varying failure distribution (having a mean time to failure of 50 hours), and an associated repair distribution (having a mean time to repair of 4 hours). The values used in the above-described simulation are consistent with at least some production print shops using a high end printing system, such as the DocuTech Publishing Printing System ("DocuTech" is a registered trademark of Xerox Corporation).

Figure 11:
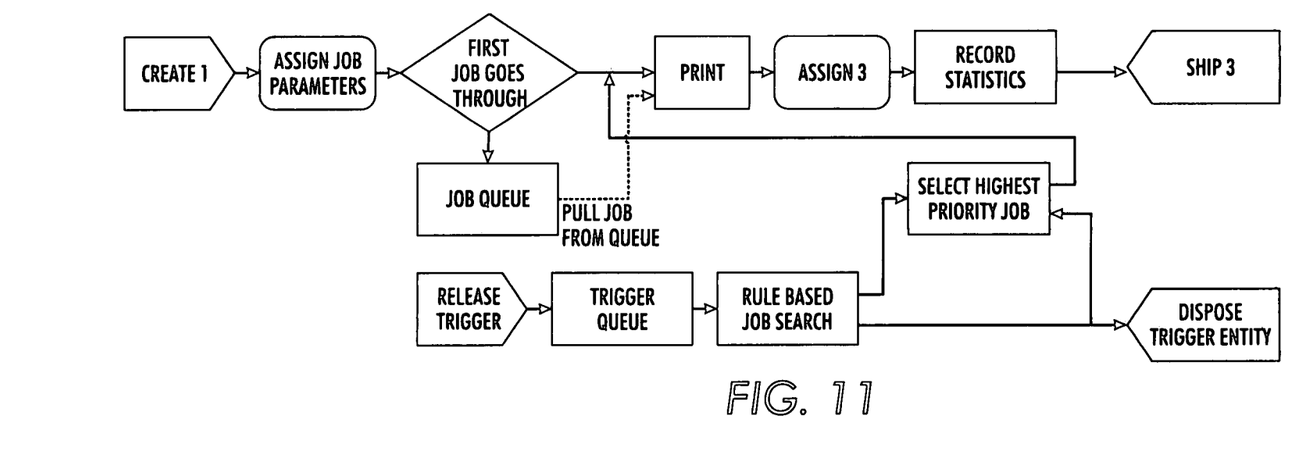
FIG. 11 is a schematic view of a simulation model for studying the impact of real-time controls on performance in the presence of random variability.

Referring to FIG. 11, a model developed with Arena Professional Edition (from Rockwell Software) for simulating the workflow model of FIG. 10 is shown. If the workflow model of FIG. 10 is simulated without controls for 20,000 hours of production time, it results in an average turnaround time (TAT: TAT=job completion time−arrival time) of 18.66 hours. The value added time that is associated with a typical job is only 1.74 hours; the rest of the time is spent by the job waiting in some queue.

Referring still to FIG. 11, a feedback control loop was added to the system that released jobs to the printer, and the jobs from the input queue were communicated to a corresponding cell with one of several job sequencing rules (also referred to below as "scheduling policies"). The results from the simulation are shown below in Table 1 and Table 2.

TABLE 1

Results from simulating various control policies at high utilization levels.

| Scheduling Policy | Turnaround Time (= Job Completion Time − Arrival Time) hours | Value Added Time (i.e. Actual time the job spent on the printer) | Printer Utilization |
|---|---|---|---|
| Open loop without control | 16.46 | 1.67 | 83% |
| Least Slack First with pull release control | 17.62 | 1.66 | 83% |
| Maximum Processing Time First with pull release control | 43.78 | 1.66 | 83% |
| First In First Out First with pull release control | 16.46 | 1.66 | 83% |
| Last In First Out with pull release control | 14.70 | 1.66 | 83% |
| Shortest Processing Time First with pull release control | 7.22 | 1.66 | 83% |

TABLE 2

Results from simulating various control policies at low utilization levels.

| Scheduling Policy | Turnaround Time (= Job Completion Time − Arrival Time) hours | Value Added Time (i.e. Actual time the job spent on the printer) | Printer Utilization |
|---|---|---|---|
| Open loop without control | 3.59 | 1.67 | 43% |
| Least Slack First with pull release control | 3.89 | 1.66 | 43% |
| Maximum Processing Time First with pull release control | 4.23 | 1.66 | 43% |
| First In First Out First with pull release control | 3.66 | 1.66 | 43% |
| Last In First Out with pull release control | 3.59 | 1.66 | 43% |
| Shortest Processing Time First with pull release control | 3.20 | 1.66 | 43% |

The simulation results shown in Table 2 were obtained under the same operating conditions as those for the results in Table 1 except that a slower job arrival rate (random arrival once every 4 hours) was used.

It is clear from the above-described example that varying real-time controls and scheduling policies can significantly impact system throughput. For example, average TAT is about 44 hours when the Maximum Processing Time release rule is used to release jobs, and about 7 hours when Shortest Processing Time release rule is used to release jobs. By way of comparison, the average TAT achieved with no scheduling is about 19 hours. At the same time, the impact of real-time feedback control is more significant at higher utilization levels.

For a given set of scheduling policies, it should be noted that TAT might vary more at one utilization than at another. For instance, referring to Table 1 above (utilization=83%), the difference between TAT for a LIFO policy and TAT for a SPT policy is 7.52 hours. By contrast, referring to Table 2 (utilization=43%), the difference between the TAT for a LIFO policy and the TAT for a SPT policy is less than an hour. With this in mind, it might be helpful to avoid policy or sequencing rule reassignment at a given queue unless the difference in TAT (or some other selected job processing related criteria, such as earliness, lateness, or percentage of early or late jobs)

between the currently assigned policy/rule and a reassignment policy/rule candidate exceeds a selected threshold. Accordingly, referring to Table 2, if LIFO policy were assigned to a given queue and no significant change in utilization was expected, a reassignment to one of a number of other policies (such as FIFO) would be unwarranted since relatively little processing time savings could be achieved. It will be appreciated by those skilled in the art of print shop workflow design that a wide variety of job processing related criteria (other than the above-mentioned TAT, earliness, lateness, and percentage of early or late jobs) could be used with the disclosed embodiments for suitably gagging the adequacy of sequencing rule assignment.

Even though the disclosed embodiments are described in the context of a document production factory, other forms of production that are amenable to easy job splitting (such as credit card production), can advantageously use the disclosed approach for dynamic queue management (of the type described above) to improve associated processing architecture. Indeed, it should now be clear that the disclosed embodiments relate to a method permitting optimal sequencing policy to be obtained for a group cells (with their attendant corresponding queues) by periodically simulating a current job mix across a variety of scheduling policies for each cell to obtain an optimal scheduling policy assignment at each cell. Consequently, in contrast to at least some prior art approaches, sequencing rule assignment is dynamic so that the group of cells dynamically adapt themselves to changes in operating conditions. Moreover, by monitoring a "profile" corresponding with the current job mix is monitored periodically, dynamic reassignment can be achieved as substantial changes in job profile are detected.

The following features also contribute to, among other things, the improved operability of the disclosed embodiments:

1) In one example, certain aspects of the disclosed method are not performed until a selected condition occurs. The selected condition may include waiting until,
   a) a selected time interval transpires,
   b) a first job profile (relating to, for instance, a first job size) differs substantially from a second job profile (relating to, for instance, a second job size),
   c) cell utilization (including device utilization and/or device user utilization) exceeds a selected threshold, or
   d) a selected event (such as the addition of a cell to a print shop or a reconfiguration of the print shop) occurs.
2) Job processing indicators (relating to, for instance, average TAT, earliness, lateness, or percentage of early or late jobs) may be compared with one another to determine which one of at least two sequencing rules should be used in setting the sequence of two or more jobs stored in a given queue.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others

What is claimed is:

1. A method of ordering print jobs in a print queue, the print queue being operatively associated with a cell having one or more print processing devices for processing print jobs, comprising:
   (A) storing a first set of at least two print jobs with a first profile in the print queue;
   (B) associating a first print job sequencing rule with the print queue, the first print job sequencing rule dictating a first print job sequence in which the first set of at least two print jobs are to be processed;
   (C) processing the first set of at least two print jobs with the cell in accordance with the first print job sequencing rule;
   (D) storing a second set of at least two print jobs with a second profile in the print queue;
   (E) determining a change between the first profile and the second profile;
   (F) performing simulations to determine if the second set of at least two print jobs should be processed in accordance with the first print job sequencing rule or a second print job sequencing rule, the second print job sequencing rule dictating a second print job sequence in a simulation of which the second set of at least two print jobs can be processed, wherein the first print job sequence is different than the second print lob sequence;
   (G) determining, using the simulations of (F), whether the second set of at least two print jobs should be processed in accordance with the first print job sequencing rule or the second print job sequencing rule; and
   (H) in response to determining that the second set of at least two print jobs should be processed in accordance with the second print job sequencing rule,
   reassigning the correspondence of the print queue from the first print job sequencing rule to the second print job sequencing rule.

2. The method of claim 1, wherein said performing of (F) includes: (i) simulating processing of the second set of at least two print jobs with the cell and the first print job sequencing rule to obtain a first print job processing indicator;
   and (ii) simulating processing of the second set of at least two print jobs with the cell and the second print job sequencing rule to obtain a second print job processing indicator.

3. The method of claim 2, wherein said determining of (G) includes comparing the first print job processing indicator with the second print job processing indicator.

4. The method of claim 3, wherein said (G) includes determining whether the second set of at least two print jobs should be processed in accordance with the first print job sequencing rule unless a difference between the first print job processing indicator and the second print job processing indicator exceeds a selected amount.

5. The method of claim 2, wherein said performing of (F) includes corresponding the first print job processing indicator with a first average turnaround time, and the second print job processing indicator with a second average turnaround time.

6. The method of claim 5, wherein said (G) includes determining the second set of at least two print jobs should be processed in accordance with the first print job sequencing rule unless the first average turnaround time differs from the second average turnaround time by a selected amount.

7. The method of claim 2, wherein said performing of (F) includes corresponding the first print job processing indicator with a first percentage value of late jobs, and the second print job processing indicator with a second percentage value of late jobs.

8. The method of claim 7, wherein said (G) includes determining the second set of at least two print jobs should be processed in accordance with the first print job sequencing rule unless the first percentage value of late jobs differs from the second percentage value of late jobs by a selected amount.

9. The method of claim 1, further comprising:(I) performing (F) through (H) when or after a selected condition occurs.

10. The method of claim 9, in which the cell corresponds with a utilization, wherein said (I) includes performing (F) through (H) when utilization at the cell exceeds a selected threshold.

11. The method of claim 10, wherein said (H) includes performing (F) through (H) when one of device utilization and device user utilization at the cell exceeds the selected threshold.

12. The method of claim 9, wherein said (I) includes performing (F) through (H) when the second profile associated with the second set of at least two print jobs is substantially different than the first profile associated with the first set of at least two print jobs.

13. The method of claim 9, in which the cell is located in a print shop and the cell is one of a plurality of cells, wherein said (I) includes performing (D) through (H) in response to either (1) adding one or more cells to the plurality of cells, (2) deleting one or more cells from the plurality of cells, or (3) reconfiguring at least one of the plurality of cells.

14. A method of ordering print jobs in a print queue, the print queue being operatively associated with a cell having one or more print processing devices for processing print jobs, comprising:
   (A) storing one set of at least two print jobs having a first profile in the print queue;
   (B) using a first print job sequencing rule to process the one set of at least two print jobs with the cell, wherein the first print job sequencing rule dictates a first print job sequence in which print jobs stored in the print queue are to be processed;
   (C) storing another set of at least two print jobs having a second profile in the print queue;
   (D) simulating processing of the other set of at least two print jobs in the cell with the first sequencing rule to obtain a first print job processing indicator;
   (E) determining if there is a change between the first profile and the second profile;
   (F) simulating processing of the other set of at least two print jobs in the cell based on a second print job sequencing rule to obtain a second print job processing indicator, wherein the second print job sequencing rule dictates a second print job sequence in which print jobs stored in the print queue are to be processed, and wherein the first print job sequence is different than the second print job sequence;
   (G) comparing the first print job processing indicator with the second print job processing indicator; and
   (H) if a difference between the first and second print job processing indicators meets a threshold, reassigning the second print job sequencing rule to the queue for processing the other set of at least two print jobs with the cell.

15. The method of claim 14, further comprising: (I) performing (C) through (H) when or after a selected condition occurs.

16. The method of claim 15, wherein said (I) includes performing (C) through (H) after a selected time interval has transpired.

17. The method of claim 15, in which the one set of at least two print jobs corresponds with the first job profile having a first attribute and the other set of at least two print jobs corresponds with the second job profile having a second attribute, wherein said (I) includes performing (C) through (H) when the first attribute differs from the second attribute by a selected amount.

18. The method of claim 17, in which the first and second attributes correspond respectively with first and second job size related values, wherein said (I) includes performing (F) through (H) when the first job size related value differs from the second job size related value by a selected amount.

19. The method of claim 15, in which the cell corresponds with a utilization level, wherein said (I) includes performing (C) through (H) when the utilization level exceeds a selected threshold.

20. The method of claim 19, wherein said (I) includes performing (C) through (H) when one of device utilization and device user utilization at the cell exceeds the selected threshold.

21. The method of claim 15, in which the cell is located in a print shop and the cell is one of a plurality of cells, wherein said (I) includes performing (C) through (H) in response to either (1) adding a cell to the plurality of cells, (2) deleting one of the plurality of cells, or (3) reconfiguring at least one of the plurality of cells.

22. The method of claim 14, further comprising: (I) corresponding the first print job processing indicator with a first average turnaround time, and the second print job processing indicator with a second average turnaround time.

23. The method of claim 22, wherein said (H) includes processing the other set of at least two print jobs with the first print job sequencing rule unless the first average turnaround time differs from the second average turnaround time by a selected amount.

24. The method of claim 23, wherein said (H) includes processing the other set of at least two print jobs with the first print job sequencing rule unless the first percentage value of late jobs differs from the second percentage value of late jobs by a selected amount.

25. The method of claim 14, further comprising: (I) corresponding the first print job processing indicator with a first percentage value of late jobs, and the second print job processing indicator with a second percentage value of late jobs.

* * * * *